Figure 1:
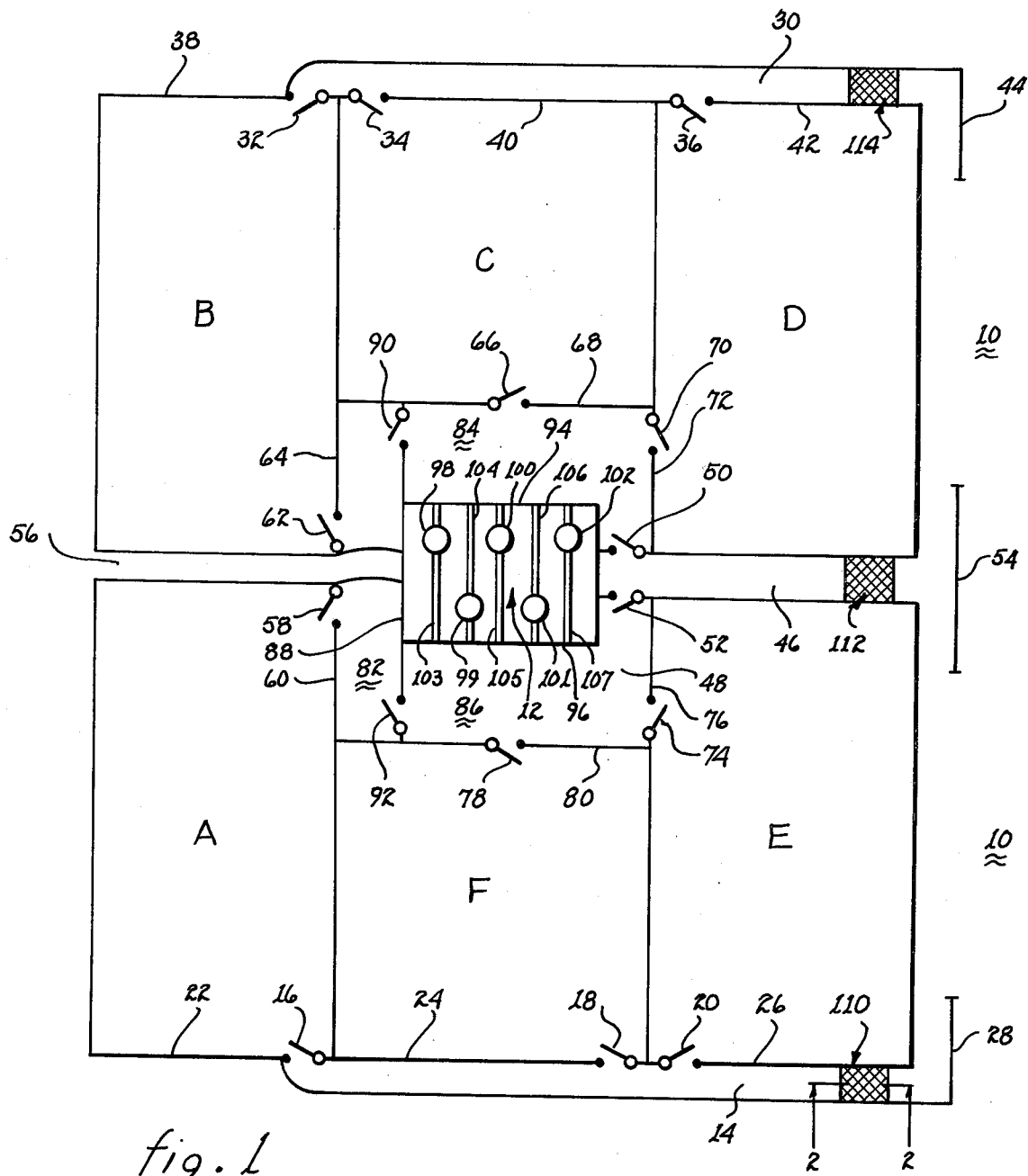

United States Patent [19]

Casebow

[11] 4,192,627

[45] Mar. 11, 1980

[54] APPARATUS FOR GENERATING ELECTRICAL POWER

[76] Inventor: Wilfred J. Casebow, Star Rte. Box 358, Elgin, Ariz. 85611

[21] Appl. No.: 942,444

[22] Filed: Sep. 14, 1978

[51] Int. Cl.$^2$ .............................................. E02B 9/08
[52] U.S. Cl. ........................................ 405/76; 290/53
[58] Field of Search ..................... 405/75, 76, 77, 80, 405/74; 290/54, 42, 53

[56] References Cited

U.S. PATENT DOCUMENTS

| 2,673,451 | 3/1954 | Gariel | 405/74 X |
| 4,162,864 | 7/1979 | Maeda et al. | 405/75 |

FOREIGN PATENT DOCUMENTS

| 437 of 1859 | United Kingdom | 405/76 |
| 223374 | 10/1924 | United Kingdom | 405/76 |
| 246760 | 2/1926 | United Kingdom | 405/76 |
| 487850 | 9/1936 | United Kingdom | 405/76 |

*Primary Examiner*—David H. Corbin
*Attorney, Agent, or Firm*—Cahill, Sutton & Thomas

[57] ABSTRACT

A continuous water flow from selected ones of a plurality of reservoirs passes through turbines or the like within an hydroelectric power station to produce electrical power. The reservoirs are cyclically filled and evacuated through the power station by operation of a plurality of gates interconnecting reservoirs having different water height levels and an adjacent source of tidal waters. By programmed operation of the gates a continuous water pressure head can be maintained at the power station to assure continuous electrical power generation.

4 Claims, 2 Drawing Figures

U.S. Patent  Mar. 11, 1980  4,192,627

APPARATUS FOR GENERATING ELECTRICAL POWER

The present invention relates to power generating systems and, more particularly, to tidal water responsive hydroelectric power stations.

For years, engineers have envisioned using the height differential caused by tidal waters as a source of energy to operate electrical power generating stations. The most commonly envisioned system includes a reservoir fillable during high tide and from which water is drawn through a generating station as the tide recedes. Variations on this theme include systems of conduits for channeling water through a power station during both the rise and fall of the tide. Although these systems are generally feasible, a fairly substantial vertical change in height of the tidal water is required to produce a sufficient head or water pressure. Tidal variations of this ilk generally only occur at the extreme northern and southern latitudes, far away from the distribution centers for the generated electrical power; hence, the cost of transport of electrical energy through transmission lines tends to negate the practicality of these power generating systems.

More recently, other systems have been developed, such as platforms floating upon tidal waters. The height changes of these platforms, due to the rise and fall of the tide, can be translated through chord and pulley systems (see U.S. Pat. No. 3,567,953) or rack and pinion gearing mechanisms (see U.S. Pat. No. 3,746,875) to rotational movement of an electrical generator. As these platforms are continuously (except for brief lulls at high and low tide) undergoing vertical movement, electrical energy can be continuously generated. The quantity of power being generated is essentially a function of the floatation support capability of the platform. On the negative side, these floating platforms must necessarily be anchored to the sea floor and they must be sufficiently robust to withstand high winds and other inclement weather. Because of the lull in vertical movement during both high and low tide, little or no electricity can be generated during these time periods, rendering the system essentially useable only as a standby electrical power generating system.

U.S. Pat. No. 3,922,013, discloses a vertically responsive platform for converting the height variations produced by waves on a water surface to a rotating mechanical element. The element, in turn, drives electric generators to produce electrical power. Necessarily, during limited wave motion, the height change may be insufficient to generate sufficient electrical power to render the power station useable at such times.

Each of U.S. Pat. Nos. 3,426,540, 3,993,913, and 4,039,847 describes sets of electrical power generating apparatus wherein each apparatus of a set is responsive to a different height level of a dammed body of water.

U.S. Pat. Nos. 2,222,790 and 2,962,599 are directed to various systems for generating hydroelectric energy through the harnessing of the water flow of streams or the like.

It is therefore a primary object of the present invention to provide a water height responsive system for continuously generating electrical power.

Another object of the present invention is to provide a tidal water responsive system for generating electrical power.

Yet another object of the present invention is to provide a plurality of interconnectable reservoirs for supplying a flow of water through a hydroelectric power station.

Still another object of the present invention is to provide apparatus for deriving energy from tidal water during both the rise and fall of the tide.

A further object of the invention is to provide self-cleaning screens for removing the debris in water flowing to a tidal water operated hydroelectric power station.

A yet further object of the present invention is to provide a high volume low flow rate water system for a hydroelectric power station.

A still further object of the present invention is to provide a water system for operating a hydroelectric power station which has a secondary function of supporting harvestable food products.

These and other objects of the present invention will become apparaent to those skilled in the art as the description thereof proceeds.

Figure 2:
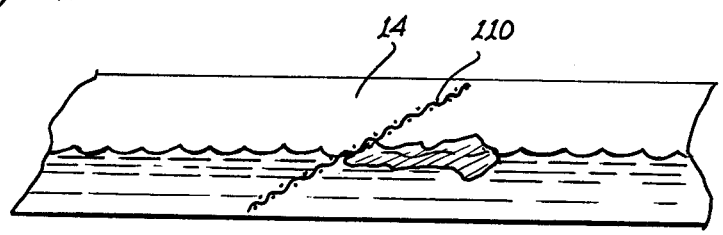

The present invention will be described with reference to the figures in which:

FIG. 1 is a plan view of the arrangement of reservoirs and hydroelectric power station; and FIG. 2 is an elevational view of the screen.

A plurality of reservoirs, such as reservoirs A, B, C, D, E, and F, are developed in proximity to a source 10 of tidal water. A hydroelectric power station 12 is disposed in a centralized location to the reservoirs; in the alternative, the station may be somewhat removed from the reservoirs provided that it is readily connectable thereto through canals or like water passageways. FIG. 1 illustrates reservoirs A through F disposed so as to surround station 12.

Each of the reservoirs may be several acres in area and should be of a depth at least equivalent to and coincident with the height between high and low tide of the source of tidal water. Since it is presumed that the land adjacent the source of tidal water is above the level of high tide, each of the reservoirs may be dug in the ground. For land below the high tide water level, the reservoirs may be defined by man made walls extending upwardly above the high tide level. The common walls or enclosures defining each reservoir may be berms or reinforced concrete walls constructed in the conventional manner. Station 12 is disposed within a water fillable depression in the ground and is surrounded by the walls of adjacent reservoirs.

Water flow to and from source 10 of tidal water is effected to reservoirs A, F, and E through a channel 14 and gates 16, 18, and 20 disposed in walls 22, 24, and 26, respectively. A break water 28 may be employed to prevent in-rushing water due to storms and the like from damaging channel 14. Similarly, a channel 30 interconnects source 10 of tidal water with reservoirs B, C, and D through gates 32, 34, and 36 in walls 38, 40, and 42, respectively. A break water 44 is employed to protect channel 30 from damage by the tidal water.

A further channel 46 interconnects enclosure 48 about station 12 with source 10 of tidal water through gates 50 and 52. A break water 54 may be employed to protect channel 46 from the tidal water. Access to station 12 may be provided by roadway 56 disposed intermediate reservoir A and B.

Each of the reservoirs includes a selectively operable gate for establishing fluid communication between the respective reservoir and enclosure 48. In example, gate 58 is disposed in wall 60 of reservoir A; gate 62 is disposed in wall 64 of reservoir B; gate 66 is disposed in wall 68 of reservoir C; gate 70 is disposed in wall 72 of reservoir D; gate 74 is disposed in wall 76 of reservoir E; and, gate 78 is disposed in wall 80 of reservoir F. Moreover, enclosure 48 is divisible into three compartments 82, 84, and 86. Compartment 82 is defined by walls 60 and 64 of reservoirs A and B, respectively, wall 68 of reservoir C, wall 88 adjacent station 12 and wall 80 of reservoir F. Gates 90 and 92 are disposed in wall 88. Compartment 84 is defined by a portion of wall 88, wall 68 of reservoir C, wall 72 of reservoir D, gate 50 and downstream side 94 of station 12. Compartment 86 is defined by a portion of wall 88, upstream side 96 of station 12, gate 52, wall 76 of reservoir E, and wall 80 of reservoir F.

As it is intended that the present invention be employable at locations wherein the difference in height between high and low tide may not be great, the hydroelectric power station must be constructed to produce electrical power in response to large volume low flow rate water rather than high flow rate water, as is conventional in most present day hydroelectric dam systems. For this reason, a plurality of turbines 98, 99, 100, 101 and 102 having their own discrete passageways 103, 104, 105, 106, and 107, respectively, are contemplated. These passageways extend from upstream side 96 to downstream side 94. It is to be understood that each of the turbines is ultimately operatively connected to an electrical power generator. The type and number of turbines are to be determined by the volume and head of water available at station 12. Although not shown, further gates may be employed to isolate each turbine from the water flow for maintenance and repair purposes. In order to establish a flow rate through the passages in station 12, the water level in compartment 86 of enclosure 48 must be higher than that of the water level in compartment 84.

From the above description, certain flow path relationships between the various reservoirs and enclosure 48 will become apparent. Each of the reservoirs is directly connectable with source 10 of tidal water. Reservoirs E and F are selectively connectable via gates 78 and 74 on upstream side 96 of station 12. Reservoirs C and D are selectively connectable to compartment 84 on the downstream side of station 12 via gates 66 and 70. Reservoirs A and B are selectively connectable through gates 58 and 62, respectively, to compartment 82 and to compartment 86 or 84 through either gate 92 or gate 90, respectively.

Assuming, ab initio, that reservoirs A through F are empty and that source 10 of tidal water is rising, a representative water flow path will be described. Gates 16, 18, and 20 of reservoirs A, F, and E would be opened to allow an inflow of tidal water thereto through channel 14; gates 58, 78, and 74, respectively, would be closed whereby these reservoirs would be filled upon a rise of the tidal water. Simultaneously, gates 50 and 92 would be closed and gate 52 would be opened to allow tidal water to flow through channel 46 into compartment 86. From compartment 86, the water would flow through passages 103 to 107 in station 12 to compartment 84. From compartment 84, the water might flow into reservoir C through gate 66, assuming gates 90 and 70 were closed. Necessarily, gates 32, 34, and 36 would be closed to preclude tidal water flow into reservoirs B, C and D through channel 30.

By inspection it will be apparent that the initial water head pressure between compartment 86 and compartment 84 is relatively small and the power generating capability of the water flowing through the station is somewhat limited. After a descreet rise in the tidal water and upon partial filling of reservoir C, a greater head pressure would exist between source 10 and either of reservoirs B or D than between the tidal water and reservoir C. To increase the head pressure between compartment 86 and compartment 84, gate 66 would be closed to shut off further flow into reservoir C while gate 70 would be opened. As the difference in head pressure between the tidal water and the level in reservoir D begins to decrease below a predetermined point, gate 70 would be closed and gates 90 and 62 would be opened to bring compartment 84 into fluid communication with reservoir B. Thence, a substantially increased water head pressure between compartment 86 and 84 may once again be established. After a certain period of time, the difference between water levels in compartment 86 and reservoir C may be greater than that between compartment 86 and reservoir B whereat gates 62 and 90 would be closed and gate 66 reopened. As may be surmised, the opening and closing of the gates attendant compartment 84 is predicated upon establishing as great a difference as possible in the water level between compartments 86 and 84 during rise of tidal water. Simultaneous with the above described operation, the water levels within reservoirs A, F, and E would increase commensurate with source 10 by flow of water through channel 14 into these reservoirs via gates 16, 18, and 20, respectively; these gates would be closed at high tide.

Shortly after high tide gate 52 is closed to preclude further flow of tidal water into compartment 86. Simultaneously, gate 74 of reservoir E may be opened along with the opening of a gate attendant compartment 84 which gate corresponds with one of reservoirs B, C, or D whichever has the lowest water level. Once the difference between the water level of the receiving reservoir and reservoir E falls below a predetermined minimum, gates 74 may be closed and the gate 78 of reservoir F may be opened. Now, one of reservoirs B, C, or D, which ever has the lowest water level, is connected with compartment 84 to maximize the available water head pressure between the upstream and downstream sides of station 12.

Once the level of source 10 of tidal water drops below the level of water in any of reservoirs B, C, or D, the respective gate interconnecting the reservoir with channel 30 is opened to drain the reservoir. When the water level in reservoir F drops to a predetermined minimum difference with respect to the water level in the receiving reservoir B, C, or D, gate 78 is closed and gates 58 and 92 are opened to bring the water within reservoir A into fluid communication with compartment 86. Thus, the difference in water level between the water discarding reservoir and the water receiving reservoir may be continually maximized.

At a certain point in time during the fall of the tide, the water level of source 10 of tidal water may be at or below the lowest water level of any of reservoirs B, C, or D. At this point, gate 50 may be opened to allow water from compartment 84 to flow directly to source 10 through channel 46. Simultaneously, gates 32, 34, and 36 would be opened to evacuate the water within reservoirs B, C, and D.

Alternatively, gate 32 may be maintained closed to maintain the water level within reservoir B until such time as the water level therein is equal to or higher than that within reservoirs A, F, and E. At such point, gate 62 and gate 92 would be opened to direct the water from reservoir B to compartment 86 and thereby establish a maximum water head pressure between compartment 86 and compartment 84. As the tidal waters reach their low point and begin to rise, gates 32, 34, and 36, if open, are closed to preclude direct tidal water flow into reservoirs B, C, and D. As the tide begins to rise, the above cycle or variations thereof may be repeated.

The operation and timing of the gates, as described above, will result in a workable system but it is to be understood that many variations, depending upon the capacity of the reservoirs, preferred flow rates through station 12, and maximum height of water level change may dictate different sequential operations. Nevertheless, the function and purpose of and sequence of gate openings and closings are to be predicated upon maintaining as great a difference in water head pressure (water level) between compartment 86 and compartment 84 to maximize the volumetric flow and flow rate through passages 103 to 107 to drive turbines 98 to 102, respectively.

Since there is a constant flow of fresh water into and out of each of the reservoirs, these reservoirs can serve an ancillary purpose of growing harvestable plants, oysters, clams etc. The only change needed is that of ensuring that the bottom of each of the reservoirs is sufficiently below the level of low tide to maintain an adequate depth of water for the crop growing therein. The attendant requirements of seeding, cultivating and harvesting the crops can be undertaken by conventional state of the art methods and apparatus. Moreover, the reservoirs can be employed to raise fish as a harvest provided requisite screens or similar barriers are installed to prevent loss of the fish during inflow and outflow of water.

Since it is quite common for tidal water to have a large amount of floating debris in the nature of logs, branches, tin cans, etc., screens 110, 112 and 114 may be disposed across channels 14, 46 and 30, respectively, as shown in FIG. 1. These screens will prevent contamination of the reservoirs with floating debris and will preclude jamming of the respective gates and turbines.

A cross-sectional view of screen 110, which is also representative of screens 112 and 114, is illustrated in FIG. 2. By slanting screen 110 upwardly toward the source of tidal water, several advantages are achieved. When water flows through channel 14 into the reservoirs, the water level will be relatively high and force the floating debris upwardly and upstream along screen 110. During discharge of water through channel 14 to the source of tidal water, the level of water within the channel will be reduced low and the debris will drop off screen 110. The dropped debris will be carried along the surface of the out flowing water; thereby, the screen will be cleansed.

Were screen 110 angled in the opposite direction, each inflow cycle of water would tend to force the debris higher and higher up the screen and no self-cleaning action would occur. This mode of screen orientation may, however, be preferrable where a great amount of debris exists such that during the inflowing water cycle, the debris would completely clog channel 14. In such case, reorientation of screen 110 is preferrable provided that periodic removal of the washed up debris were undertaken.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A hydroelectric power generating station for use with tidal waters, said station comprising in combination:
   (a) means for generating electrical power in response to a flow of water, said generating means including an upstream side and a downstream side;
   (b) a first compartment disposed in fluid communication with said upstream side for maintaining a continuing source of water for said upstream side;
   (c) a second compartment disposed in fluid communication with said downstream side for maintaining a continuing receptacle for the flow of water from said downstream side;
   (d) a first plurality of reservoirs for supplying water to said first compartment;
   (e) first gate means for regulating the source of flow of water to said first compartment from the reservoirs of said first plurality of reservoirs;
   (f) first channel and gate means for replenishing the water in said first plurality of reservoirs from the tidal water;
   (g) a second plurality of reservoirs for receiving water from said second compartment;
   (h) second gate means for regulating the flow of water from said second compartment to the reservoirs of said second plurality of reservoirs;
   (i) second channel and gate means for discharging the water in said second plurality of reservoirs to the tidal water;
   whereby, said first channel and gate means are actuated to maximize the water levels in said first plurality of reservoirs, said second channel and gate means are actuated to minimize the water levels in said second plurality of reservoirs, said first and second compartments maintain a continuing source and receptacle, respectively, for the water flowing through said gernating means and said first and second gate means are actuated to maximize the water head pressure between said first compartment and said second compartment.

2. The station as set forth in claim 1 including third channel and gate means for providing direct fluid communication between the tidal water and one of said first compartment and said second compartment.

3. The station as set forth in claim 2 including a third plurality of reservoirs and third gate means for interconnecting a flow of water from a reservoir of said third plurality of reservoirs with one of said first compartment and said second compartment.

4. The station as set forth in claim 3 including a third compartment disposed in fluid communication with said first compartment, said second compartment and said third plurality of reservoirs through said third gate means.

* * * * *